United States Patent Office 3,477,875
Patented Nov. 11, 1969

3,477,875
BATTERY HAVING ELECTRODEPOSITED SEPARATOR ON THE PLATES AND METHOD OF MAKING SAME
James M. McQuade, Fort Wayne, Ind., assignor to General Electric Company, a corporation of New York
No Drawing. Filed Sept. 21, 1965, Ser. No. 489,059
Int. Cl. H01m 3/00, 35/00, 17/04
U.S. Cl. 136—6                                  7 Claims

ABSTRACT OF THE DISCLOSURE

A porous, insoluble inorganic hydroxide or hydrous oxide coating of a metal such as calcium, magnesium, nickel, cadmium, aluminum, or zirconium is deposited on at least one electrode of an alkaline electrolyte cell to act as a separator. Coatings onto such electrodes as nickel, cadmium, silver oxide, and zinc electrode plates is specifically disclosed. The coating may be formed by electrolysis of a water soluble compound of the metal sought to be included in the hydroxide.

---

The present invention relates to batteries and to novel battery plates used therein. More particularly, the invention relates to batteries provided with novel plates having electrodeposited separators thereon and to an improved method for the deposition of such separators.

In alkaline type batteries, cloth-like separators are commonly used to prevent internal shorting of the positive and negative plates and to serve as a wick to contain the battery electrolyte. However, separators of this nature have inherent disadvantages in that they increase the overall battery size, interact chemically with the electrolyte, especially at high temperature, increase the internal battery resistance, and cause dendrite formation and migration of the plate materials.

The present invention provides the advantages of the cloth-like separators while eliminating the disadvantages discussed hereinbefore.

More specifically, the present invention is directed to batteries and to plates therein provided with separators comprising coatings of inorganic materials which have been electrodeposited in thin layers. The invention is further directed to a method of producing the same wherein the separator is a thin adherent porous coating which is electrically non-conducting and chemically inert.

An object of the present invention is the provision of an alkaline battery which is of decreased size, decreased internal resistance and has separators possessing good wicking qualities.

A further object of the invention is the provision of a battery which eliminates dendrite formations and migration of the plate material thereby preventing internal shorting.

Yet another object is the provision of a battery and a method of producing the same wherein the separator is a coating which is electrically non-conducting, chemically inert, porous and of a uniform thickness.

Still another object is the provision of a water activated battery wherein a saturated solution of calcium hydroxide is employed as the electrolyte.

These and other objects and advantages of the invention will become more readily apparent from the following description.

The present invention in its broadest aspects contemplates alkaline batteries and water activated batteries provided with at least one separator which is a thin layer of inorganic material deposited on at least one plate. In its more specific aspects, the invention relates to batteries in which one or more plates has deposited thereon a thin adherent coating of a hydroxide or hydrous oxide compound. Also, within the scope of the invention are the coated plates and the electrolytic method whereby said coatings are obtained. Provision in a battery of plates having such coatings as separators has been found to eliminate the prior art disadvantages enumerated above.

The separators or plate coatings, in accordance with the present invention, are obtained by electrodeposition of a hydroxide or hydrous oxide directly upon the surface of the plates. Uniform adherent coatings are deposited on the plates within an electrolysis cell which employs a soluble salt of calcium, magnesium, nickel, cadmium, etc., as the electrolyte. Also within the scope of the invention is the use of a saturated solution of calcium hydroxide as electrolyte. The cell itself may employ as the anode, as one specific example, stainless steel, whereas the plates being coated comprise the cathode.

With respect to the anode, any inert metal may be employed. In actual coating, the thickness of the coating per unit time depends upon the current density, electrolyte concentration, temperature, and the size, number and spacing of the plates. By controlling these factors, the deposition thickness may be controlled.

In practice, it is desirable to employ an electrolyte which upon electrolysis produces an inorganic, insoluble hydroxide or hydrous oxide precipitate which forms the separator coating. Suitable electrolytes, by way of illustration only, include calcium acetate, magnesium acetate, calcium nitrate, magnesium nitrate, cadmium nitrate, nickel nitrate, calcium hydroxide, etc.; also of use in this invention are the hydrous oxide electrolysis reaction products of aluminum nitrate and zirconium nitrate. Upon electrolysis of an aqueous solution, insoluble compounds such as calcium hydroxide, magnesium hydroxide, cadmium hydroxide, nickel hydroxide and the hydrous oxides of aluminum and zirconium are produced and deposited in a thin adherent porous layer on one or more of the plates.

The mechanism of the electrodeposition process apparently involves the discharge of hydrogen gas via the following reaction:

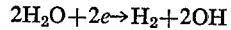

$$2H_2O + 2e \rightarrow H_2 + 2OH$$

As the electrolysis proceeds and hydrogen gas is evolved, the local concentration of hydroxyl ions at the cathode-electrolyte interface becomes high enough to exceed the solubility product of the hydroxide and so precipitation takes place on the surface of the cathode. With the use of an inert anode, such as stainless steel, in combination with an aqueous solution of calcium acetate, the overall reaction may be written as:

(1) $Ca(C_2H_3O_2)_2 + 3H_2O \rightarrow Ca(OH)_2$
$$+ 2HC_2H_3O_2 + H_2 + \tfrac{1}{2}O_2$$

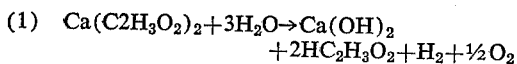

Oxygen is evolved at the anode and results from the oxidation of hydroxyl ions at its surface. Since acetic acid is produced in the reaction and tends after a period of time to make the solution unduly acid, solid calcium hydroxide powder may be added prior to electrolysis. Such additions serve not only to keep the pH constant but also to keep the initial amount of calcium acetate constant. To illustrate the deposition mechanism, the following reactions occur when using magnesium acetate, magnesium nitrate and calcium nitrate:

(2) $Mg(C_2H_3O_2)_2 + 3H_2O \rightarrow Mg(OH)_2$
$$+ 2HC_2H_2O_2 + H_2 + \tfrac{1}{2}O_2$$

(3) $Mg(NO_3)_2 + 3H_2O \rightarrow Mg(OH)_2$
$$+ 2HNO_3 + H_2 + \tfrac{1}{2}O_2$$

(4) $Ca(NO_3)_2 + 3H_2O \rightarrow Ca(OH)_2$
$$+ 2HNO_3 + H_2 + \tfrac{1}{2}O_2$$

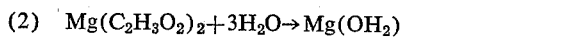
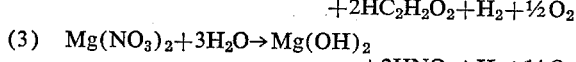
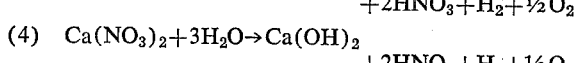

In reactions (2) and (3) magnesium hydroxide will be deposited and magnesium oxide or magnesium hydroxide powder may be added to the electrolysis cell prior to deposition. The amount of hydroxide which may be deposited is strongly dependent on the operating conditions. Table 1 shows the effect of salt concentration, time and temperature when coating standard nickel nickel electrodes (2¾" by 2¼") normally used in nickel-cadmium batteries at 50 amperes per foot squared.

TABLE 1

| Solution | Deposit | Gm./ft.² | Time | Bath Temperature, °C. |
|---|---|---|---|---|
| Ca (C₂H₃O₂)₂-60 g./l | 1-Ca (OH)₂ | 4.2 | 5 min., 30 sec. | 25-31 |
| Ca (C₂H₃O₂)₂-60 g./l | 2-Ca (OH)₂ | 5.1 | 5 min., 50 sec. | 31-36 |
| Ca (C₂H₃O₂)₂-60 g./l | 3-Ca (OH)₂ | 8.6 | 21 min. | 100 |
| Ca (C₂H₃O₂)₂-60 g./l | 4-Ca (OH)₂ | 7.7 | 6 min., 50 sec. | 91 |
| Ca (C₂H₃O₂)₂-10 g./l | 5-Ca (OH)₂ | 3.2 | 3 min., 45 sec. | 27-32 |
| Ca (C₂H₃O₂)₂-10 g./l | 6-Ca (OH)₂ | 3.2 | 3 min., 35 sec. | 32-37 |
| Ca (C₂H₃O₂)₂-10 g./l | 7-Ca (OH)₂ | 6.1 | 3 min., 30 sec. | 90 |
| Ca (C₂H₃O₂)₂-10 g./l | 8-Ca (OH)₂ | 5.3 | 3 min., 30 sec. | 86 |
| Mg (NO₃)₂ 454 g. | 9-Mg (OH)₂ | 2.4 | 3 min. | 87 |
| Mg (NO₃)₂ 454 g. | 10-Mg (OH)₂ | 3.2 | 6 min. | 87 |

Although it is readily apparent that any compound of the foregoing description may be utilized as the electrolyte, calcium and magnesium nitrates and acetates as well as calcium hydroxide are preferred. Soluble salts of other metals may be employed, notably those of nickel and cadmium.

The concentration of the compound utilized in the aqueous electrolyte solution may vary from a very small value, perhaps 0.01 molar, up to a saturated solution. A satisfactory concentration has been found to be approximately 0.8 molar. This value will vary depending upon the particular compound, temperature, size of the area to be coated and other factors.

Various tests have been performed on batteries produced by the methods described hereinbefore. Examples of such tests, which are by way of illustration only, and the results obtained are described below:

EXAMPLE I

In the manner hereinbefore described, a nickel plate was provided with a calcium hydroxide deposit to a thickness of approximately 0.001 inch. This plate was sandwiched between two uncoated plates of cadmium. All the plates were of standard size, i.e., 2¾" by 2¼" and an aqueous solution of 31% potassium hydroxide was utilized as a battery electrolyte in sufficient quantity to completely cover the plates. The battery was charged for 36 minutes and then discharged for 24 minutes. This charge-discharge cycle was continuous. The battery remained operational for approximately 1000 cycles before internal shorting occurred.

EXAMPLE II

A similar test was conducted with a battery provided with a nickel plate coated with magnesium hydroxide. Internal shorting did not occur until after 300 cycles.

Silver oxide-zinc batteries may also be provided with at least one plate coated in the manner described above. The advantages of such batteries may be illustrated by the following examples wherein Examples III and IV utilize uncoated plates and Examples V and VI utilize plates coated in accordance with the invention.

It has further been found that a water activated battery can be provided by the method of this invention. Thus, it has been found that by electrolytically depositing calcium hydroxide on both the silver oxide and zinc plates of AgO-Zn battery and using a saturated solution of calcium hydroxide as electrolyte, a marked improvement in energy density and life at low drain rates can be obtained. Although the parasitic consumption of zinc by an aqueous solution of calcium hydroxide is low, the use of the electrolyte by itself does not result in a long lifed cell at low drain rates. The foregoing will become apparent by comparing Examples III and IV with Examples V and VI.

EXAMPLE III

The battery tested had a silver oxide plate, a zinc plate physically separated therefrom by a 1/32 inch spacing, and a saturated solution of calcium hydroxide as electrolyte. This battery was loaded at 1.0 milliampere. The following results were obtained:

| Time in hours: | Battery voltage in volts: |
|---|---|
| Start of discharge | 1.84 |
| 10 | 1.84 |
| 82 | 1.80 |
| 126 | 1.68 |
| 142 | 1.58 |
| 157 | 1,38 |
| 162 | 1.18 |
| 169 | .86 |
| 178 | .76 |
| 190 | .62 |

After approximately 126 hours it was observed that the zinc plate had turned black. Shortly thereafter, black dendrites extended from the zinc electrode to the silver oxide electrode.

EXAMPLE IV

The battery employed was of the same construction as in Example III except that the spacing between plates was 3/32 inch. The following results were obtained:

| Time in hours: | Battery voltage in volts: |
|---|---|
| Start of discharge | 1.80 |
| 54 | 1.60 |
| 90 | 1.34 |
| 114 | 1.12 |
| 143 | 1.00 |
| 190 | .74 |

Here again, dendrites extended from the zinc plate to the silver oxide plate.

EXAMPLE V

A silver oxide plate and a zinc plate were both coated with a deposit of calcium hydroxide to a weight of 0.24 g. and 0.43 g., respectively. The plates were separated by a standard nylon separator and a saturated solution of calcium hydroxide was utilized as the electrolyte. A resistive load placed on the battery drew a current of 0.85 milliamperes. The following results were obtained:

| Time in Hours: | Battery Voltage in volts | Internal Resistance |
|---|---|---|
| Start | 1.80 | |
| 512 | 1.22 | |
| 504 | 1.21 | |
| 648 | 1.12 | |
| 840 | 1.12 | Load dropped to 0.5 ma. 8.5 ohms. |
| 1,032 | 1.40 | Load dropped to 0.1 ma. 5.0 ohms. |
| 1,200 | 1.32 | |
| 1,416 | 1.22 | |

At the end of approximately 1400 hours the battery was 90% discharged. This was based on a measurement of the silver capacity of the battery.

EXAMPLE VI

A silver oxide plate having a deposit of 0.16 g. of calcium hydroxide was pressed directly to a zinc plate coated with 0.78 g. of calcium hydroxide, and a saturated aqueous solution of calcium hydroxide was employed as the electrolyte. The battery was loaded to draw a current of 0.85 milliampere. Test results were as follows:

| Time in Hours: | Battery Voltage in Volts | Internal Resistance |
|---|---|---|
| Start | 1.80 | |
| 264 | 1.44 | |
| 1,224 | 1.44 | Load dropped to 0.1 ma. 65 ohms. |
| 1,704 | 1.36 | |
| 1,920 | 1.22 | Load dropped to 1.1 ma. 87 ohms. |

At the end of the test, the battery was 60% discharged, based upon the silver capacity.

As can be seen by the results of the tests of Examples III to VI, and particularly V and VI, plate coating in accordance with the invention provides silver oxide-zinc batteries of extremely long life which can be activated by merely adding water.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A water activated silver oxide-zinc battery wherein the silver oxide and zinc plates are separated by a thin, adherent, porous coating of calcium hydroxide electrodeposited thereon and the electrolyte therebetween is an aqueous solution of calcium hydroxide.

2. In a silver oxide-zinc cell the improvement in which at least one of the silver oxide and zinc plates is separated from adjacent plates by a thin, adherent, porous coating of calcium hydroxide electrodeposited thereon.

3. A battery comprising a plurality of plates with an electrolyte therebetween, at least one of said plates having deposited thereon as a separator a thin, adherent, porous coating which is non-conducting and chemically inert selected from the group consisting of calcium hydroxide, magnesium hydroxide, and hydrous oxides of aluminum and zirconium, said plates being separated at least by the thickness of said coating, and at least a portion of said electrolyte being absorbed within said porous coating.

4. The battery of claim 3 wherein at least one plate is coated with calcium hydroxide.

5. The battery of claim 3 wherein at least one plate is coated with magnesium hydroxide.

6. A method of forming a multi-plate alkaline storage battery wherein at least one plate has an electrodeposited separator thereon which is electrically non-conducting and chemically inert comprising a thin, adherent, porous coating of a compound selected from the group consisting of hydroxides and hydrous oxides, comprising the steps of forming and depositing said coating on said plate by the electrolysis of a water soluble compound having a metallic ion selected from the group consisting of calcium, magnesium, aluminum and zirconium.

7. A method of forming a battery plate with a separator thereon comprising a thin, adherent, porous coating which is electrically non-conducting and chemically inert and which comprises a compound selected from the group consisting of hydroxides and hydrous oxides, comprising the steps of forming and depositing said coating on said plate by the electrolysis of a water soluble compound having a metallic ion selected from the group consisting of calcium, magnesium, aluminum and zirconium.

References Cited

UNITED STATES PATENTS

| | | | |
|---|---|---|---|
| 571,531 | 11/1896 | Langhans | 204—56 |
| 917,875 | 4/1909 | Jungner | 136—28 |
| 1,402,751 | 1/1922 | Edison | 136—28 |
| 1,442,238 | 1/1923 | Smith | 136—24 |
| 2,945,078 | 7/1960 | Chapman et al. | 136—20 |
| 3,118,100 | 1/1964 | Chreitzberg | 136—30 XR |

WINSTON A. DOUGLAS, Primary Examiner

A. SKAPARS, Assistant Examiner

U.S. Cl. X.R.

136—100, 146